(12) United States Patent
Huang et al.

(10) Patent No.: US 8,430,165 B2
(45) Date of Patent: Apr. 30, 2013

(54) INCREASING THE VISCOSITY OF VISCOELASTIC FLUIDS

(75) Inventors: Tianping Huang, Spring, TX (US); James B. Crews, Willis, TX (US); Gaurav Agrawal, Aurora, IL (US)

(73) Assignee: Baker Hughes Incorporated, Houston, TX (US)

( * ) Notice: Subject to any disclaimer, the term of this patent is extended or adjusted under 35 U.S.C. 154(b) by 421 days.

(21) Appl. No.: 12/783,190

(22) Filed: May 19, 2010

(65) Prior Publication Data

US 2011/0284228 A1 Nov. 24, 2011

(51) Int. Cl.
*E21B 43/26* (2006.01)
(52) U.S. Cl.
USPC ............. 166/272.2; 166/292; 166/308.1; 166/335
(58) Field of Classification Search ............... None
See application file for complete search history.

(56) References Cited

U.S. PATENT DOCUMENTS

| | | | |
|---|---|---|---|
| 6,703,352 | B2 | 3/2004 | Dahayanake et al. |
| 7,723,272 | B2 | 5/2010 | Crews et al. |
| 2001/0020531 | A1 | 9/2001 | Varadaraj et al. |
| 2008/0236832 | A1* | 10/2008 | Fu et al. ............ 166/308.2 |
| 2008/0296024 | A1* | 12/2008 | Huang et al. ............ 166/311 |

FOREIGN PATENT DOCUMENTS

WO 2005112580 A2 12/2005

OTHER PUBLICATIONS

Carlsson, Anders et al., "Thermal Gelation of Nonionic Cellulose Ethers and Ionic Surfactants in Water," Colloids and Surfaces, vol. 47, pp. 147-165 (1990).
Kalur, Gokul C., et al., "Viscosity Increase With Temperature in Cationic Surfactant Solutions Due to the Growth of Wormlike Micelles," Langmuir, vol. 21, pp. 10998-11004 (2005).

\* cited by examiner

*Primary Examiner* — Zakiya W Bates
(74) *Attorney, Agent, or Firm* — Mossman Kumar & Tyler PC

(57) ABSTRACT

In hydrocarbon recovery applications, viscoelastic surfactant (VES) gelled fluids may be preheated to a temperature that will increase viscosity of the VES gelled fluid. The preheated VES gelled fluid retains at least a portion of its preheated viscosity when cooled such as by introduction into a low temperature condition. In an embodiment, the VES gelled fluid may be a drilling fluid, completion fluid, or fracturing fluid, and the low temperature condition may be an offshore operation, an operation in a locality having a cold climate, and/or a shallow oil, gas, or both land-based operation where the formation temperature is 120° F. or less. The surfactant in the VES gelled fluid may be one or more of an amine, amine salt, quaternary ammonium salt, betaine, amidoamine oxide, amine oxide, and combinations thereof.

20 Claims, 5 Drawing Sheets

INCREASING THE VISCOSITY OF VISCOELASTIC FLUIDS

TECHNICAL FIELD

Nonlimiting embodiments disclosed herein relate to gelled fluids for use in subterranean formations during hydrocarbon recovery operations, and more particularly relate to viscoelastic surfactant gelled aqueous fluids for use in low-temperature hydrocarbon recovery operations.

BACKGROUND

Hydrocarbons may exist in reservoirs in subterranean rock formations. Generally, to produce the hydrocarbons from the formation, a wellbore is drilled in the formation and hydrocarbons travel from the formation to the wellbore through pores in the formation. The better the pores in the formation are connected (i.e. permeability), the better the hydrocarbon production. Some wells are poor producers from the beginning, whereas other wells produced satisfactorily only to decline into a poor producing well. Poor hydrocarbon production is commonly associated with decreased permeability due to plugged pores.

Hydrocarbon recovery stimulation techniques may be employed to improve the permeability of hydrocarbon-bearing formations. One such technique is fracturing, namely hydraulic fracturing. Hydraulic fracturing uses pump rate and hydraulic pressure to fracture or crack a subterranean formation thereby improving permeability of and production from the formation to the wellbore. To avoid "healing" of the formation after fracturing conditions are reduced or removed, a proppant, which is highly permeable relative to formation permeability, may be pumped downhole and into the fracture to prop it open. Since the proppant is highly permeability, it may provide a path for hydrocarbon flow. When an acid is used in the fracturing fluid to increase or restore permeability to the formation, the treatment term is "acid fracturing" or "acid frac".

The fracturing fluid may be a thickened aqueous fluid. Traditionally, aqueous fracturing fluids have had their viscosities increased by incorporating hydratable polymers therein (e.g. polysaccharides), where some polymers may be crosslinked to increase viscosity even further. When aqueous fluids incorporating hydratable polymers are used downhole, the polymer may accumulate on and within the formation to form a polymeric filter cake. The formation may be damaged (e.g. plugged pores) when these polymeric filter cakes are incompletely removed prior to hydrocarbon production, which in turn may inhibit hydrocarbon production.

Non-polymeric viscoelastic surfactants (VES) are an alternative agent for thickening aqueous treating fluids. VES gelled aqueous fluids may exhibit very high viscosity at very low shear rates and under static conditions, which makes them an excellent choice for treating fluids such as fracturing fluids. Furthermore, some VES gelled fluids may be easier to remove from the formation, which may lead to less damage as compared to the polymeric-based fluids.

The viscosity of VES gelled fluids may be temperature dependent—the higher the temperature (to a point) the more viscous the fluid becomes. This temperature dependence may be beneficial in land-based operations where the earth's heat may warm the fluid or keep it warm. In offshore operations, however, the water temperature may be less than the surface temperature, and the temperature in deeper waters most certainly is less than the surface temperature. The viscosity of VES gelled fluids may be adversely affected in such cold conditions. For instance, less viscous fluids may have a diminished solids carrying capacity and/or fracturing capability.

Thus, it would be desirable if methods could be devised to enable VES gelled treating fluids to have higher viscosities in low temperature conditions.

SUMMARY

In a nonlimiting aspect, a method is provided to obtain a viscoelastic surfactant (VES) gelled treating fluid having an increased viscosity while in a low temperature condition of about 150° F. (about 66° C.) or less. The VES gelled fluid may be preheated to a temperature that is at least 60% of its peak viscosity temperature. The viscoelastic surfactant gelled treating fluid is useful in hydrocarbon recovery operations and its composition includes, without limitation, an aqueous solution selected from the group consisting of water, brine, natural sea water, and mixtures thereof; and at least one viscoelastic surfactant in an amount effective to increase the viscosity of the aqueous solution. In an embodiment, the viscoelastic surfactant gelled treating fluid is preheated before being introduced into a subterranean formation. For instance, and without limitation, it may be at least partially preheated before being introduced into the low temperature condition, after being introduced into the low temperature condition, or both. Nonlimiting examples of low temperature conditions include offshore operations, localities having a cold climate; and shallow hydrocarbon land-based operations.

In another nonlimiting aspect, a method is provided for an offshore hydraulic fracturing operation, gravel packing operation or both. Generally, a viscoelastic surfactant gelled fracturing fluid, gravel packing fluid, or both (i.e. a VES gelled treating fluid) may be preheated to a temperature that is at least 60% of its peak viscosity temperature to increase the viscosity of the viscoelastic surfactant gelled treating fluid. The composition of the viscoelastic surfactant gelled treating fluid includes, without limitation, an aqueous brine; at least one viscoelastic surfactant in an amount effective to increase the viscosity of the brine; and an optional internal breaker. The preheated, gelled fracturing and/or gravel packing fluid may be cooled as it is delivered from the sea surface to a subterranean formation, and the cooled, gelled treating fluid may be introduced into the subterranean formation, where the viscosity of the cooled, gelled fracturing fluid and/or gravel packing fluid is greater than its viscosity before being preheated and less than its viscosity at its peak viscosity temperature.

DETAILED DESCRIPTION

Figure 1:
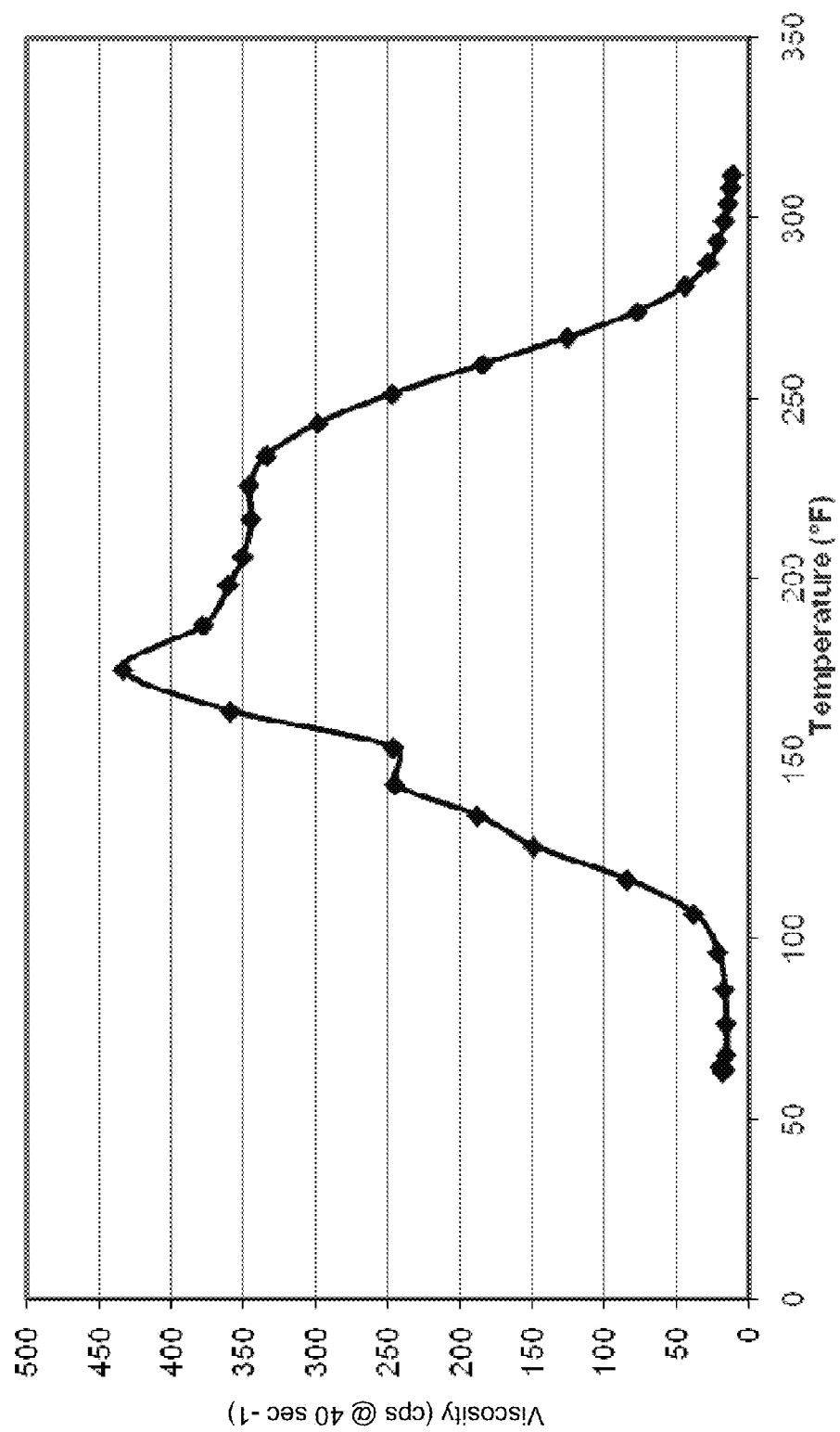
FIG. 1 is a graph of the viscosity of a VES gelled fluid in a 11.6 pounds per gallon (ppg) (1.39 kg/m$^3$) CaCl$_2$ brine with 4% by volume (by) WG-3L VES as a function of temperature.

Fluids typically become less viscous upon heating. For example, crystallized honey will become liquefied with low heat. But the viscosity of viscoelastic surfactant (VES) gelled fluids may initially increase with heat before they start to thin out. This phenomenon is shown in the graph of FIG. 1. As is shown in the figure, a graph of the viscosity of a VES gelled fluid as a function of its temperature produces a "bell-shaped" viscosity curve. In this instance, the fluid's initial viscosity is about 19 centipoises (cP) at a fluid temperature of about 65° F. (about 18° C.) and its viscosity increases to a peak viscosity point of about 433 cP at about 175° F. (about 79° C.). With continued heating however, the viscosity of the VES gelled fluid decreases such that when its temperature is about 312° F. (about 156° C.) its viscosity is about 11 cP.

Figure 2:
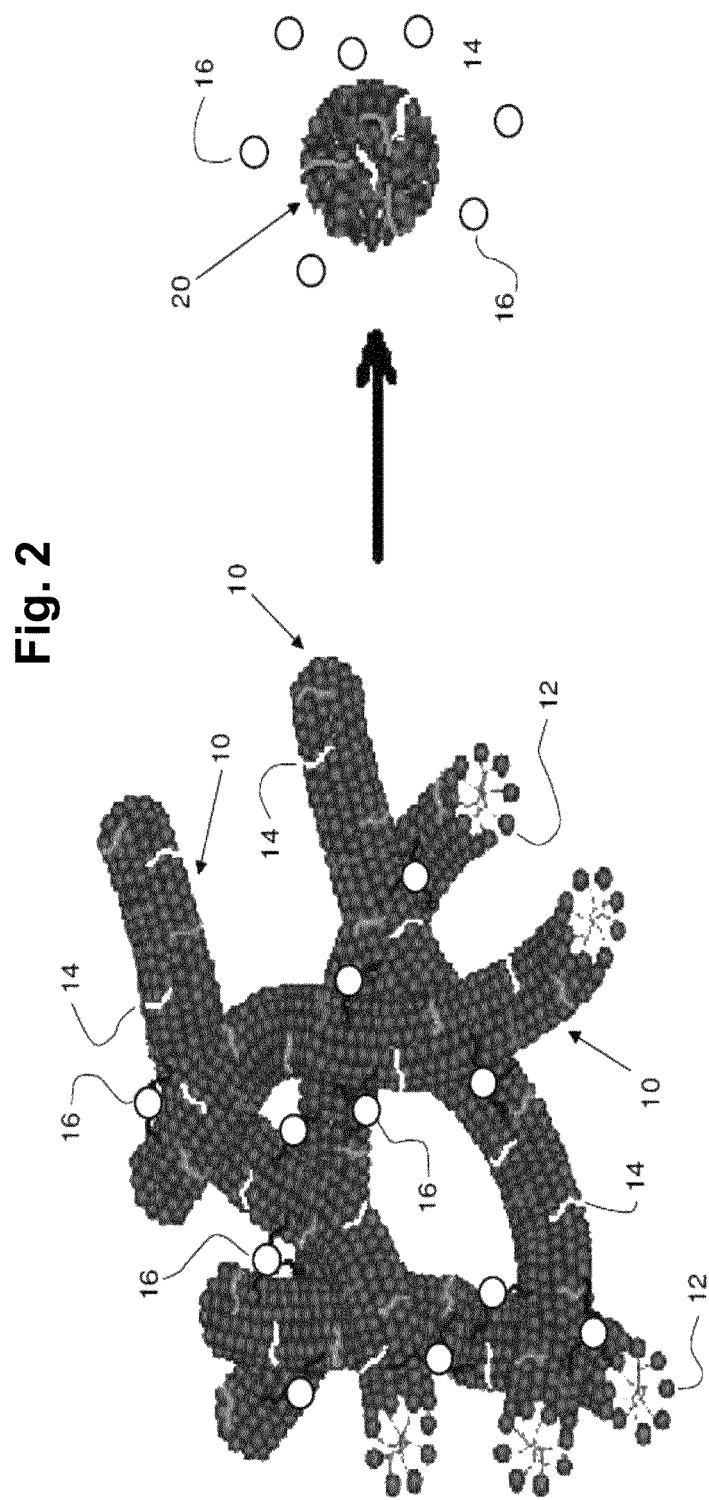
FIG. 2 illustrates micelle structures in VES gelled fluids, and further illustrates a nonlimiting embodiment of the breaking of the VES gelled fluid by an internal breaker.

The increased viscosity of viscoelastic surfactant gelled fluids is believed to be due to a change in the arrangement of surfactant molecules in the fluid. For instance, the surfactant molecules are low molecular weight molecules having hydrophilic heads and hydrophobic tails, and as such, they form micelles in aqueous solutions. Micelles in VES gelled fluids may be spherical or worm-like or rod-like. The transition from spherical to the worm or rod-like micelles is accompanied by a dramatic increase in fluid viscosity and transitioning back to the spherical shape is associated with a decrease in fluid viscosity. FIG. 2 is a schematic illustrating the different micelle structures. Referring to the left side of FIG. 2, the arrangement of the surfactants 12 in the rod- or worm-like micelle 10 structure is shown. The rod or worm-like micelles 10 may be entangled (and/or have other interactions), which may account for the dramatic increase in fluid viscosity. Still referring to the left side of the figure, this nonlimiting embodiment also includes fluid loss control particles 16 and internal breakers 14. In embodiments incorporating internal breakers 14, it is believed that, upon breaker activation, the internal breakers will collapse (i.e. break) the rod-like or worm-like micelles 10 to spherical micelles 20 and fluid loss control particles 16, which is shown on the right side of the figure.

Higher viscosity VES gelled fluids can effectively carry more solids such as proppants and/or gravel than less-viscous VES gelled fluids. Furthermore, highly viscous VES fluids are also better at fracturing rock formations than less viscous VES fluids due to higher fluid viscosity resulting better fluid leakoff control. In low temperature conditions, however, such as 150° F. (about 66° C.) or less, VES gelled fluid viscosity may not be adequately yielded, which may adversely affect the fluid's capability to hydraulically fracture and/or gravel pack rock formations. Nonlimiting examples of low temperature conditions include cold regions and relatively shallow oil and/or gas land-based operations where the temperatures of rock formations may be less than 120° F. (49° C.) and offshore applications, where the water temperature gets colder with depth.

New methods have been discovered to increase the viscosity of VES gelled fluids in low temperature conditions without the need to change the fluid's formulation. The new methods are believed to improve the solids carrying capacity, rate of fluid leak-off, friction reduction, and other hydraulic fracturing capabilities when using VES gelled fluids in low temperature conditions, such as offshore hydrocarbon recovery and land shallow rock formation operations. Surprisingly, it has been discovered that if viscoelastic surfactant gelled fluids are preheated to temperatures that are at or near their peak viscosity temperatures (i.e. the temperature where peak or maximum fluid viscosity occurs), fluid viscosity will be at least partially maintained when subsequently subjected to lower temperature conditions. Moreover, these preheated VES gelled fluids are more viscous after preheating than before preheating even if cooled to the starting temperature. It is believed that the higher viscosities obtained by preheating VES gelled fluids will improve the hydraulic fracturing and gravel packing capabilities of VES gelled fluids for lower temperature applications, such as below 150° F. (66° C.). One possible, nonlimiting explanation for the observed at least partial maintenance of fluid viscosity is that as the temperatures of the fluids increase during preheating, the rod-like or worm-like micelle structures have additional energy for development to increase fluid viscosity. And since fluid preheating is stopped before there is a substantial decrease in fluid viscosity, (i.e. preheating is stopped soon after the peak viscosity temperature is reached) the rod or worm-like micelles remain the predominant micelle structure within the fluid. Then, as fluid temperatures decrease, at least a portion of the rod-like or worm-like micelle structures are believed to keep their elongated, entangled condition. Because the forgoing is a possible explanation for what the inventors have observed, the inventors do not wish to be bound by this or any other mechanism or explanation.

A viscoelastic surfactant solution may be heated, or more correctly preheated, by any heating method using any appropriate heating apparatus. For example, the VES fluid can be circulated through tubes with heating jackets and/or oil-bath oven. But because a number of factors may come into play, such as the power of heating jackets, volume of heated oil, and circulating rates, preheating rates and durations may vary greatly. As a general guideline however, a VES treating fluid may be simply heated as desired to a temperature that is at or near its peak viscosity temperature. Exemplary, nonlimiting mean preheating rates and durations for VES gelled fluids include from about 2° F. to about 4° F. per half minute until the peak viscosity temperature or thereabouts is reached, which may take at least 20 minutes, 25 minutes, or more for laboratory-sized samples.

Referring back to FIG. 1, a "bell-shape" fluid viscosity curve is shown. This type of viscosity profile is expected for typical VES gelled fluids when fluid viscosity is plotted against fluid temperature. That is, VES gelled fluids typically increase in viscosity, reach a peak viscosity, and then decrease in viscosity over a given temperature range, such as from 75° F. (24° C.) to 300° F. (149° C.). Different VES gelled fluid formulations (i.e. type and amount of VES product, type and amount of salt, if present, within the mixwater, etc.) will show maximum viscosity yield at different temperature points. The peak viscosity temperature can be determined through laboratory tests for a given VES fluid formulation. For instance, fluid viscosity verses temperature measurements can be made through use of a waterbath and Fann 35 viscometer, or by a Fann 50 type rheometer, or by other types of rheometers. The peak viscosity temperature may be thought of as the temperature where maximum fluid viscosity occurs for a given VES gelled fluid. The peak viscosity temperature for the VES gelled fluid of FIG. 1 is about 170° F. (about 77° C.).

The peak viscosity temperature for one VES gelled fluid may not be the same as the peak viscosity temperature for another VES gelled fluid as maximum fluid viscosity depends on one or more variables such as, but not limited to, type and amount of salt or salts if present in the treatment fluid, type and amount of VES product, type and amount of other treatment fluid additives (e.g. viscosity enhancers, fluid loss control agents, internal breakers, biocides, defoamers, scale inhibitors, gas hydrate inhibitors, and the like), inconsistencies in VES production batches, impurities in the salts or brines if used, rust or other metals that may contaminate the fluid during mixing or use, pH buffers, corrosion inhibitors, other surfactants, oils, among other variables. Peak viscosity temperatures for some, but not necessarily all, VES gelled fluids range from about 160° F. to about 220° F. (about 71° C. to about 104° C.).

Although it is preferable to preheat a VES gelled fluid to a temperature that is at or near its peak viscosity temperature, preheating does not have to be so exact. As one nonlimiting example, the VES gelled fluid may be preheated to a temperature that is at least about 60% of the fluid's peak viscosity temperature, and in another nonlimiting example, the fluid may be preheated to a temperature that is at least about 90% of the fluid's peak viscosity temperature. For example and without limitation, if the peak viscosity temperature of a VES gelled fluid is 170° F. (about 77° C.), it may be preheated to at least 102° F. (about 39° C.), or more preferably to at least to about 153° F. (about 67° C.) before utilizing the fluid for downhole operations.

After a VES gelled fluid has been preheated to a desired temperature, it is ready for use in low temperature operations. Although it is contemplated that a preheated VES gelled fluid will be cooled primarily by introduction to low temperature conditions, such as introduction into a pipe submerged in cold sea waters, embodiments are not so limited—a preheated VES gelled fluid may be cooled in any way including simply removing the heat source from the preheated fluid. Thus, in one sense cooling is simply cooling to any temperature that is less than the maximum temperature to which the VES gelled fluid was preheated. In practice however, cooling after preheating may be via introduction to any number of environmental/surrounding conditions, such as surface ambient temperatures, temperatures of or surrounding equipment (e.g., mixer, trailer, rig, platform, boat, or any other relevant equipment), or wellbore temperatures that are less than about 150° F. (about 66° C.).

It has been discovered, that after being preheated to temperatures at or near their peak viscosity temperatures, cooled VES gelled fluids have increased viscosities compared to their starting viscosities. This increased viscosity is believed to be due to retention of rod-like or worm-like micelle structures after preheating has stopped, although embodiments are not limited to this mechanism. In one non-limiting embodiment, the extent or magnitude to which the viscosity of a VES gelled fluid increases may depend on factors such as the type and amount of salinity in the mixwater brine, and the selected VES product type and concentration. Other factors may include, but are not limited to, type and amount of optional additives (e.g. viscosity enhancers, fluid loss control agents, internal breakers, biocides, defoamers, scale inhibitors, gas hydrate inhibitors, and the like), inconsistencies in VES production batches, impurities in the salts or brines used, rust or other metals that may contaminate the fluid during mixing or use, pH buffers, corrosion inhibitors, other surfactants, oils, chelants, organic acids, mineral acids, and the like. Thus, viscosity increases may be highly variable. Preferably, however, after preheating the viscosities of cooled VES gelled fluids will be at least two times greater than their viscosities before preheating. Even more preferably, preheated, cooled VES gelled fluids will have viscosities that are at least 10 times greater than their viscosities before preheating, and even more preferred is for the cooled VES gelled fluids to be at least 19 times more viscous after preheating than before preheating. The forgoing preferred embodiments are nonlimiting as viscosity increases may be highly variable.

According to a nonlimiting embodiment, the fluid gelled with a viscoelastic surfactant may be an aqueous fluid for use in hydrocarbon recovery operations such as drilling, completion, and/or stimulation operations. Generally, when viscoelastic surfactants are mixed with an aqueous fluid, a viscous gel will develop and with applied heat will continue to develop. Other than the desired aqueous fluid and viscoelastic surfactant, the treating fluid may contain other components as are known in the art. Exemplary components that may be present in one or more treating fluids include, but are not limited to, fluid loss control agents, viscosity stabilizers, viscosity enhancers, biocides, defoamers, internal breakers, internal breaker enhancers, and the like.

As mentioned in the paragraph above, the aqueous fluid may be any suitable aqueous fluid such as, without limitation, water, brine, natural seawater, and mixtures thereof. If the aqueous fluid is a brine, a salt may be added to the mix water in an amount appropriate for the VES gelled fluid's intended use. The salt added to the water to make the brine may be a chloride, bromide, formate or acetate salt. The salt cations may be lithium, sodium, potassium, calcium, magnesium, zinc, ammonium, cesium, and rare earths. Mixtures of salts may also be employed. In fact, such mixtures are common. Furthermore, mix water salinity may be any desired concentration but is expected to be from about 3 wt % to about 40 wt % in many applications based on the total aqueous fluid. Two nonlimiting examples of suitable brines include 11.6 ppg (1.39 kg/m$^3$) $CaCl_2$ and 14.2 ppg (1.70 kg/m$^3$) $CaBr_2$.

The viscoelastic surfactant added to the aqueous fluid may be one or more selected from the group consisting of non-ionic, cationic, anionic, or amphoteric/zwitterionic surfactants, which includes VES systems that are familiar to those in the well service industry. Nonlimiting examples of such VES systems are those that include one or more of amines, amine salts, quaternary ammonium salts, amidoamine oxides, betaines, amine oxides, and the like. It should be noted that some non-ionic VES gelled fluids are inherently less damaging to formations than cationic fluid types, and are more efficacious per pound than anionic gelling agents. The DiamondFRAQ™ fluid system sold by Baker Hughes Inc is one nonlimiting example of a non-ionic surfactant VES system.

Amine oxide viscoelastic surfactants, however, may potentially offer more gelling power per pound, making them less expensive than other fluids. In a nonlimiting embodiment, an amine oxide viscoelastic surfactant may have the following general structure (I):

where R is an alkyl or alkylamido group averaging from about 8 to 24 carbon atoms and R' are independently alkyl groups averaging from about 1 to 6 carbon atoms. In a particular embodiment, which is nonlimiting, R is an alkyl or alkylamido group averaging from about 8 to 16 carbon atoms and R' are independently alkyl groups averaging from about 2 to 3 carbon atoms. In another particular, nonlimiting embodiment the amine oxide is APA-T, sold by Baker Hughes Inc. as part of the SurFRAQ™ fluid system. SurFRAQ™ is a VES liquid product that is 50% APA-T and greater than 40% propylene glycol. In another non-restrictive embodiment, the amine oxide may be an amidoamine oxide such as Akzo Nobel's AROMOX® APA-T formulation, which should be understood as being a dipropylamine oxide since both R' groups are propyl (see, e.g., structure (I)).

Zwitterionic VES surfactants may have good biodegradability and/or less ecotoxicity, which makes them an attractive VES surfactant choice. Nonlimiting examples of zwitterionic/amphoteric surfactants include dihydroxyl alkyl glycinate, alkyl ampho acetate or propionate, alkyl betaine, alkyl amidopropyl betaine and alkylimino mono- or di-propionates derived from certain waxes, fats and oils.

The amount of VES included in a treatment fluid may depend on many factors but no less than an amount effective to increase the viscosity of the aqueous fluid. If the treatment fluid is a fracturing fluid, the amount may depend on at least two specific factors. One factor involves generating enough viscosity to control the rate of fluid leak off into the pores of the reservoir or fracture, and the other factor involves creating a viscosity high enough to fracture the formation during the hydraulic pumping. Thus, depending on the application, the amount of VES added to the aqueous fluid may range from about 0.5% to 25% by volume, or up to about 12 vol % of the total aqueous fluid (from about 5 to 120 gallons per thousand gallons (gptg)). In another nonlimiting example, the amount of VES may range from about 1.0% to about 6.0% by volume VES product, or from a lower limit of about 2% independently to an upper limit of about 10 volume %.

In some instances, the VES-based fracturing fluid may be used as a foamed fracturing fluid, since it may contain a significant amount of a foamable surfactant (e.g. an amine oxide surfactant). As such, the fracturing fluid may be energized by gases (i.e. may contain a gas phase for better or more distribution), such as $CO_2$ and $N_2$ and the like during the fracturing treatment.

In some embodiments, VES gelled fluids may optionally include at least one viscosity enhancer. Certain viscosity enhancers may also aid with fluid loss control, which is discussed below. Suitable viscosity enhancers include, but are not limited to, pyroelectric particles, piezoelectric particles, and mixtures thereof. It is believed that when fluids containing these viscosity enhancers are heated and/or placed under pressure, the particles develop surface charges that associate, link, connect, or relate the VES micelles to one another to increase the viscosity of the fluid.

Specific examples of suitable viscosity enhancers include, but are not necessarily limited to ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. An effective amount of viscosity enhancer ranges from about 0.1 to about 500 pptg (about 0.012 to about 60 kg/m$^3$) based on the total aqueous viscoelastic treating fluid.

The stability of gelled VES fluids, especially at high temperatures, may be enhanced by viscosity stabilizing agents; thus, embodiments of viscoelastic surfactant fluids may also include one or more high temperature viscosity stabilizers. In most cases, the viscosity stabilizers stabilize or sustain VES fluid viscosity at elevated fluid temperatures, such as above 180° F. (about 82° C.), rather than increase the fluid viscosity. Viscosity stabilizing agents may be selected from the group consisting of alkali metal oxides, alkali metal hydroxides, alkali earth metal oxides, alkali earth metal hydroxides, transition metal oxides, transition metal hydroxides, glycols, polyols, and combinations thereof. Nonlimiting examples of specific viscosity stabilizers include magnesium oxide, magnesium hydroxide, calcium oxide, calcium hydroxide, sodium hydroxide, and the like. Viscosity stabilizers may have, in one nonlimiting embodiment, an average particle size of 500 nanometers or less. Stabilizers of this size may be small enough to be non-pore plugging and to remain with the VES fracturing fluid wherever it goes during the fracturing treatment and during flowback.

Embodiments of viscoelastic surfactant gelled fluids may also include fluid loss control agents. Generally, fluid loss control agents help reduce the rate of fluid leak-off, such as during fracturing treatments. Some of the viscosity enhancers discussed above may function as fluid loss control agents at higher concentrations, such as about 15 pptg (1.5 kg/m$^3$). Suitable fluid loss agents may also include, but are not necessarily limited to, alkali earth metal oxides, alkali earth metal hydroxides, transition metal oxides, transition metal hydroxides, and mixtures thereof, such as MgO, ZnO and the like. In some embodiments, certain materials, such as those containing alkali metals and/or alkaline earth metals, may function as viscosity stabilizers in addition to fluid loss control agents and/or viscosity enhancers. Multi functioning of this type is not necessary however, and different viscosity enhancers, fluid loss control agents, and viscosity stabilizers may be employed. In one nonlimiting embodiment, the amount of fluid loss control agent may range from about 2 to about 200 pptg (about 0.2 to about 24 kg/m$^3$) based on the VES gelled fluid.

In a preferred, albeit nonlimiting, embodiment the VES gelled fluid may also include one or more internal breakers. The use of internal breakers is more fully described in U.S. Ser. No. 11/679,018, which was filed on Feb. 26, 2007 and published as U.S. Patent Application Publication 2008/0202744 and is incorporated herein by reference in its entirety. In some embodiments, both internal and external breakers may be utilized. Generally, internal breakers are those that may be added to the VES gelled fluid whereas external breakers are those that are used separately from the VES gelled fluid. For example and without limitation, internal breakers may be added to a VES gelled fluid before, during, or after batch mixing or on-the-fly after continuous mixing. If used separately from the VES gelled fluid, the same breakers may act as external breakers to remove VES gelled fluids already placed downhole.

A simplified, nonlimiting explanation as to how internal breakers may reduce viscosity is that they disrupt the worm-like or rod-like micelles and transform them to spherical, non-viscous micelles, as is shown in FIG. 2. Such disruption may be triggered by a condition such as elevated temperature (e.g. from about 100 to about 400° F. (about 38 to about 204° C.)) and/or the auto-oxidation of fatty acids. In this way, reducing fluid viscosity may occur in a controlled manner after an adequate time has lapsed for the desired application. This is true even if the VES gelled fluid includes other components such as viscosity enhancers and stabilizers and the like. Ideally, the VES gelled fluid will be designed to break at or near formation temperature, after treatment is completed. Unlike with preheating, it is believed that once the viscosity is completely reduced by elevated temperatures it will not reheal or regain viscosity upon cooling to room temperature. It is, however, possible that some reheal will occasionally occur.

Nonlimiting examples of suitable internal breakers include transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof. Bacteria may also be used alone or conjunction with these other internal breakers.

Mineral oil is a preferred internal breaker, but embodiments are not limited thereto. Specific examples of suitable mineral oils include, but are not necessarily limited to, BENOL®, CARNATION®, KAYDOL®, SEMTOL®, HYDROBRITE® and the like mineral oils available from Crompton Corporation, ESCAID®, EXXSOL® ISOPAR® and the like mineral oils available from ExxonMobil Chemical, and similar products from other mineral oil manufacturers.

Because a number of factors come into play, it is often difficult to determine how much the internal breaker (or combination of internal breakers) is needed to sufficiently break or reduce VES gelled fluid viscosity. These factors include, but are not limited to, the particular VES used to gel the fluid; the particular internal breaker used; the temperature of the fluid; the downhole pressure of the fluid, the starting pH of the fluid; and the complex interaction of these various factors. A nonlimiting approximation for an effective amounts of mineral oil ranges from about 5 to about 25,000 parts per million (ppm), based on the total amount of the fluid and another nonlimiting approximation the effective range for mineral oils may be from a lower end of about 50 independently to an upper end of about 12,000 ppm.

When the forgoing internal breakers are provided separately from the VES gelled fluid they may be considered as external breakers. For instance, if a VES gelled fluid, such as one without an internal breaker, is already downhole, the now external breaker may be provided to reduce the viscosity of the gelled fluid for easier removal. Furthermore, any other external breaker may be suitable to reduce the viscosity of VES gelled fluids such as, without limitation, a sufficient quantity of reservoir hydrocarbons, including crude oil and condensate or other hydrocarbons.

In those VES gelled fluids for use in treatments such as fracturing and/or gravel packing, solids may also be present. Exemplary solids include, without limitation, proppants, gravels, or both. Nonlimiting examples of propping agents include quartz sand grains, glass and ceramic beads, bauxite grains, walnut shell fragments, aluminum pellets, nylon pellets, and the like. Proppants are typically added to the aqueous fluid after it has been gelled and are normally used in concentrations from about 1 to 14 pounds per gallon (120-1700 kg/m$^3$) of fracturing fluid composition, but higher or lower concentrations can be used as the fracture design required.

The VES gelled treating fluid may also include other additives common to the well service industry such as water wetting surfactants, non-emulsifiers, biocides and the like.

It is envisioned that preheating VES gelled treating fluids to increase their viscosity may be useful in any applicable low temperature hydrocarbon recovery operation including, without limitation, drilling operations such as drill-in fluids, spacers, loss circulation pills, and the like; completion operations such as sweep pills, fluid loss control pills, wellbore cleanup fluids, gravel packing, and the like; and stimulation operations such as diverter pills, hydraulic fracturing, frac-packing, and the like. For example, in offshore operations fluids may be unloaded from a rig, platform, vessel, or the like to the seafloor where the well is drilled or being drilled. The unloaded fluid will naturally cool until it reaches the seafloor, but after entering rock, the fluid will be naturally heated. To counter the effects of natural cooling, VES gelled fluids may be preheated to temperatures at or near their peak viscosity temperatures before being unloaded from the platform or the like. In this way, as the VES gelled fluids naturally cool they may stay more viscous than their original viscosity before being preheated. If viscosity of preheated VES gelled fluids is at least partially maintained during natural cooling, the solids (if present) may remain suspended or a greater amount of particles may stay suspended in the preheated VES gelled fluids. Furthermore, preheating of the VES gelled fluid may reduce friction pressure at the low temperature section of the unloading system (e.g. tubing, pipe, or the like), and if a fracturing operation, the retained viscosity may assist in better fracture of the formation.

The components of the VES gelled fluid may be prepared at an offshore or land-based location using any suitable mixing apparatus and method. For example, VES gelled fluids may be prepared by batch mixing, which may include blending the selected components for a period of time sufficient to mix the components together, such as from about 15 minutes to about 1 hour. In embodiments including an internal breaker system, the internal breaker may be added to the VES gelled fluid either before, during, or after the viscoelastic surfactant depending upon the breaker(s) selected. Alternatively, the internal breaker(s) may be added to the VES gelled fluid on-the-fly after continuous mixing.

Furthermore, preheating may take place, before, during, and/or after the VES product is added to the aqueous solution. As one non-limiting example, the aqueous solution, such as a mixwater, may be preheated before adding the VES product to the mixwater. Alternatively, the aqueous solution may be preheated while the VES product is being added thereto, and/or after adding the VES product. Regardless of when and how the components of the VES fluid are added and/or mixed, the VES fluid can eventually be heated to a temperature that is at least 60% of its peak viscosity temperature to increase fluid viscosity.

Heat for preheating may be imparted via any number and combination of mechanisms and/or steps. For instance, in one non-limiting example, at least a portion of the heat for preheating may be imparted by adding a dry divalent salt, such as $CaCl_2$ or the like to the aqueous solution to heat the solution to some degree by exothermic reactions during salt dissolving. Heat, or additional heat, for preheating may be imparted by one or more suitable techniques. Suitable techniques include, without limitation, using one or more heated pipes or tubes and/or an oil-bath oven to impart heat to a fluid. As one nonlimiting example, the tube and/or pipe that the fluid is circulated through may be heated by one or more heating jackets or any other pipe/tube-heating technique as is known in the art. The heated tube/pipe or other heating mechanism may be placed at any location from the surface (e.g. whether on land, sea, or an offshore rig or the like) and the fracturing point or it may be continuous from the surface to the fracturing point. Additionally, or alternatively, heat may be imparted to the fluid before it is released from the surface. In one nonlimiting embodiment, if the wellhead is on the seafloor, the VES gelled fluid may be heated or preheated by a heating element that is part of the subsea system. Such heating may accelerate natural heating of the VES gelled fluid in the rock formation.

After the desired downhole treatment is completed, preheated VES gelled fluids may need to be cleaned up or otherwise have their viscosities decreased. One way to do this is to cause the worm-like or rod-like micelles in the VES gelled fluids to revert or rearrange to spherical micelles. This may be accomplished by one or more breaker systems such as external breakers, internal breakers, as previously discussed, or both, although embodiments are not so limited. Use of internal breakers may provide a time controlled decay in viscosity of the preheated VES gelled fluid where needed.

EXAMPLES

Example 1

FIG. 1 is a graph of the viscosity of a VES gelled fluid, 11.6 ppg (1.39 kg/m$^3$) $CaCl_2$ brine with 4% by volume (by) WG-3L amine oxide VES (available from Baker Hughes) as a function of temperature. This example shows the viscosity versus temperature 'bell-shape' profile typical for VES fluids. Viscosity testing was performed on a Grace 5600 rheometer at temperatures from about 64° F. to about 308° F. (from about 18° C. to about 153° C.) with 300 psi (2.1 MPa) pressure and 40 sec$^{-1}$ shear. Initially, the fluid temperature was about 65° F. (about 18° C.) and its viscosity was about 19 cP. It can be seen that the viscosity of the fluid increased with increasing temperature to a peak viscosity point; thereafter, the viscosity decreased with increased temperature. The peak viscosity temperature for this VES fluid was about 170° F. (about 77° C.). The viscosity of this VES gelled fluid at the peak viscosity temperature was about 433 cP.

Example 2

Figure 3:
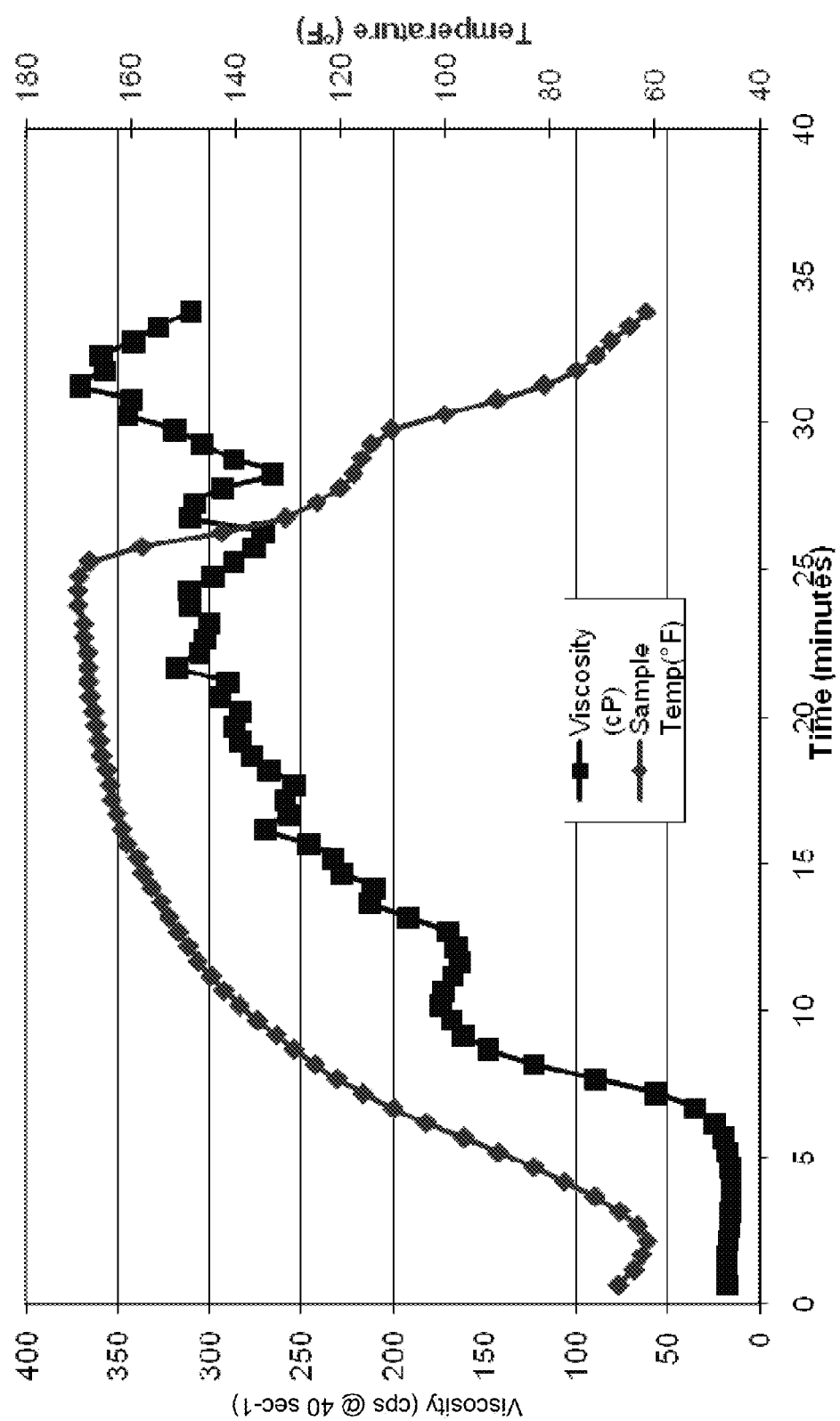
FIG. 3 is a graph of the viscosity and temperature of a VES gelled fluid in 11.6 ppg (1.39 kg/m$^3$) CaCl$_2$ brine with 4% by volume (by) WG-3L VES, both as a function of time.

Referring to FIG. 3, a graph of sample viscosity and sample temperature is shown, both as a function of time. The VES gelled fluid (i.e. the sample) formulation in this example was the same as that in Example 1. In this Example, sample fluid viscosity was measured using a Grace 5600 rheometer with 300 psi (2.1 MPa) pressure and 40 sec$^{-1}$ shear as fluid temperature increased from 67° F. to 170° F. and then decreased to about 67° F.

Initially, at about 1 minute and about 67° F. (about 19° C.), the viscosity of the sample was about 17 cP. After heating to a temperature of about 170° F. (about 77° C.), which took about 24 minutes at a mean rate of about 2.5° F./0.5 minutes, the viscosity of the sample increased to about 311 cP. Surprisingly, upon cooling the sample for about 9 minutes to about the starting temperature, the viscosity of the sample remained elevated.

In this Example the peak fluid viscosity of the sample was about 318 cP at a peak viscosity temperature of about 168° F. After being cooled to about 65° F. (about 18° C.) the viscosity of the sample fluid was increased to about 328 cP. Thus, after preheating the sample to a few to several degrees above its peak viscosity temperature and cooling to below its start temperature, the viscosity of the VES gelled fluid (the sample) was about 19 times greater than it was before being preheated. In this example, the "peak temperature" and the "peak viscosity temperature" are not the same.

Example 3

Figure 4:
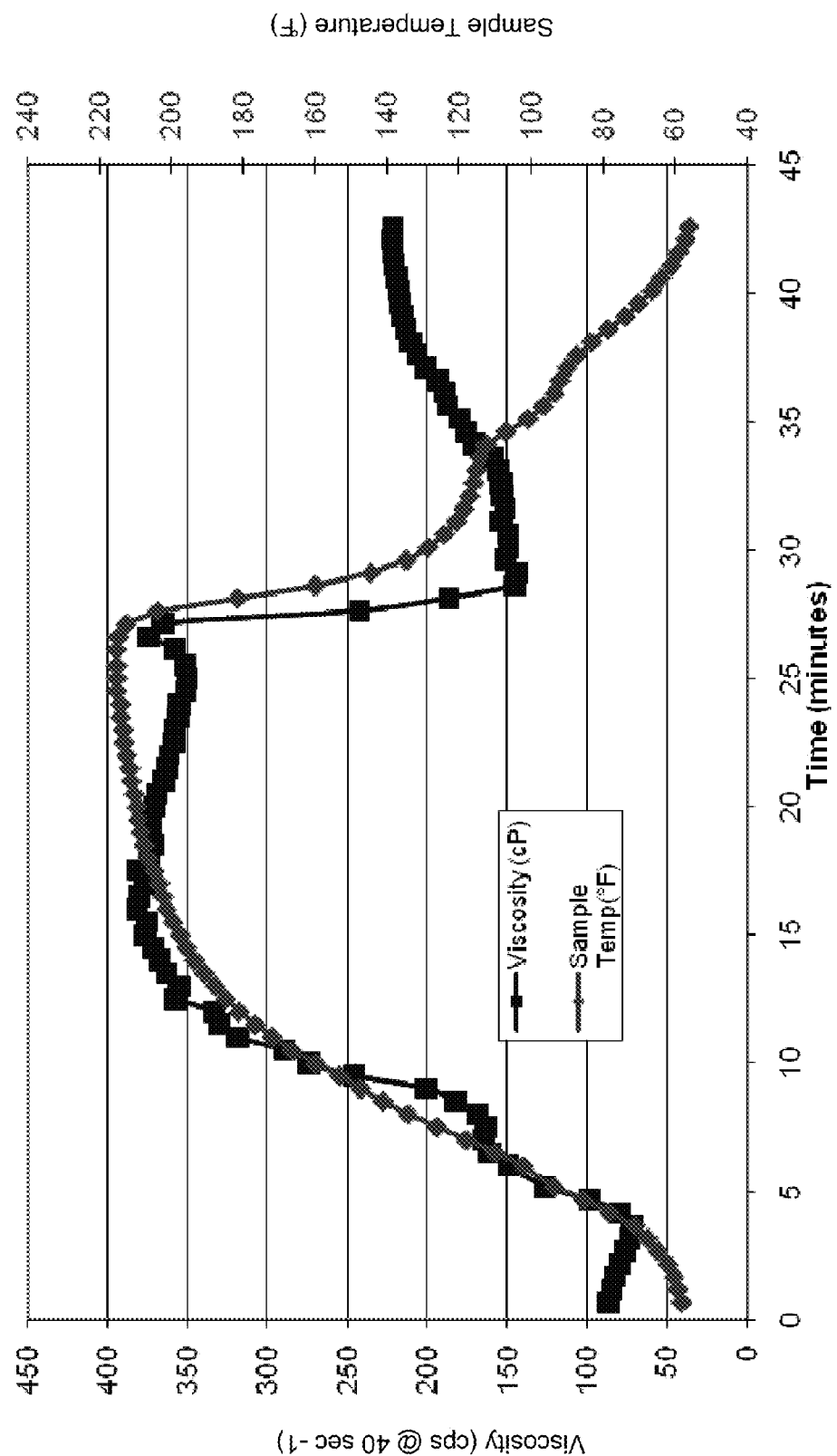
FIG. 4 is a graph of the viscosity and temperature of a VES gelled fluid in 14.2 ppg (1.70 kg/m$^3$) CaBr$_2$ brine with 4% by WG-3L VES and having 10 pounds per thousand gallons (pptg) 35 nm ZnO as a fluid loss control agent, both as a function of time.

In FIG. 4, a graph shows sample viscosity and sample temperature both as a function of time. In this Example, the sample was a VES gelled fluid, 14.2 ppg (1.7 kg/m$^3$) $CaBr_2$ plus 10 pptg (1.2 kg/m$^3$) 35 nm ZnO brine with 4% by WG-3L VES. Viscosity was measured using a Grace 5600 rheometer with 300 psi (2.1 MPa) pressure and 40 sec$^{-1}$ shear as sample temperature increased from 58° F. to 215° F. and then decreased to about 58° F.

At the beginning of the run, sample temperature was about 58° F. (about 14° C.) and viscosity about 87 cP. As can be seen in the figure, the peak viscosity of the sample was about 381 cP at a peak viscosity temperature of about 201° F. (about 94° C.), and the highest temperature to which the sample was heated was about 215° F. (about 102° C.) with a viscosity of about 351 cP. Again, in this Example, the peak viscosity temperature and the highest temperature to which the sample was heated are not the same. It took about 25 minutes to preheat the sample of Example 3 to the highest temperature at a mean preheating rate of about 3° F./0.5 min. As with Example 2, the viscosity of the sample fluid of Example 3 remained high even after the fluid was cooled to the preheated temperature. In this case, the increase in sample fluid viscosity at about 58° F. (about 14° C.) was about 2.5 times greater after preheating to its peak viscosity temperature than before.

Example 4

Figure 5:
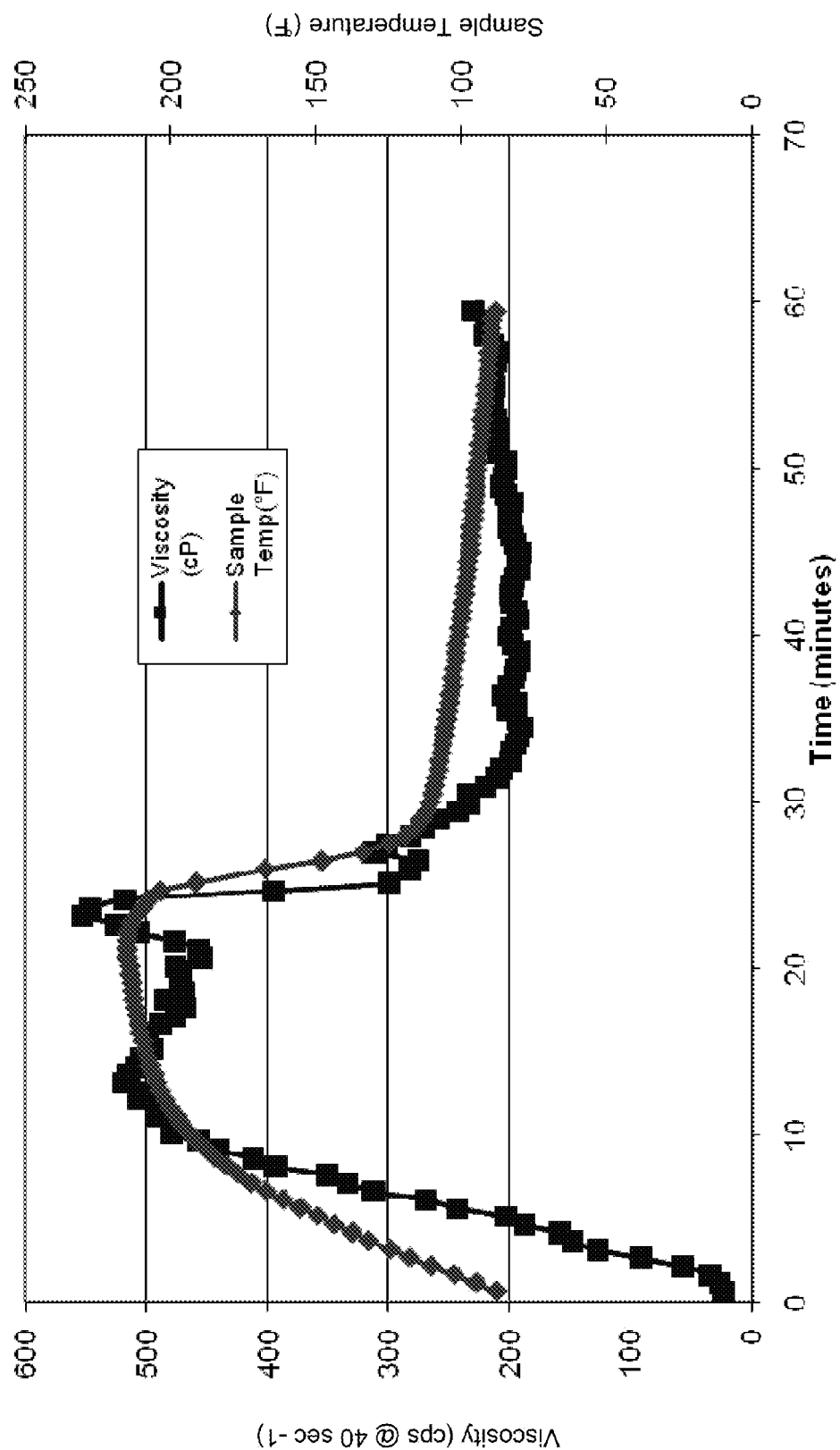
FIG. 5 is a graph of the viscosity and temperature of a VES gelled fluid in 11.6 ppg (1.39 kg/m$^3$) CaCl$_2$ with 4% by WG-3L and having 10 pptg 35 nm MgO as a fluid loss control agent, both as a function of time.

In FIG. 5, a graph for another sample is shown where its viscosity and temperature are both given as a function of time. In this example, the sample was a VES gelled fluid, in 11.6 ppg $CaCl_2$ (1.39 kg/m$^3$) plus 10 pptg (1.2 kg/m$^3$) 35 nm MgO brine with 4% by WG-3L VES. Fluid viscosity was measured using a Grace 5600 rheometer with 300 psi (2.1 MPa) pressure and 40 sec$^{-1}$ shear as sample temperature increased from about 88° F. (about 31° C.) to about 215° F. (102° C.) then decreased to about 88° F.

At the beginning of the run, sample temperature was about 88° F. (about 31° C.) and its viscosity was about 23 cP. As can be seen in the figure, the sample's peak viscosity was about 520 cP at a peak viscosity temperature of 205° F. (about 96° C.), whereas the highest temperature to which the sample was heated was about 215° F. (about 102° C.) with a viscosity of about 478 cP. It took about 22 minutes (at an average preheating rate of about 3.4° F./0.5 minutes) to heat the sample fluid of Example 4 to the high temperature and about 38 minutes to cool it back down to its starting temperature. As with Examples 2 and 3, the viscosity of the sample fluid of Example 4 was at least partially maintained even after it was cooled to the preheated temperature. In this case, the increase in sample viscosity at about 88° F. (about 31° C.) was about 10 times greater after being preheated to its peak viscosity temperature than before preheating.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of VES compositions and pre-heating methods not specifically identified or tried in a particular composition or method, are anticipated to be within the scope of this invention.

The words "comprising" and "comprises" as used throughout the claims is to interpreted "including but not limited to".

What is claimed is:

1. A method for obtaining a viscoelastic surfactant gelled treating fluid having an increased viscosity while in a low temperature condition of about 150° F. (about 66° C.) or less comprising, preheating the viscoelastic surfactant gelled treating fluid to a temperature that is at least 60% of its peak viscosity temperature, the viscoelastic surfactant gelled treating fluid composition comprising:
   an aqueous solution selected from the group consisting of water, brine, natural sea water, and mixtures thereof; and
   at least one viscoelastic surfactant in an amount effective to increase the viscosity of the aqueous solution.

2. The method of claim 1 further comprising preheating to a temperature that is at least 90% of the viscoelastic surfactant gelled treating fluid's peak viscosity temperature.

3. The method of claim 1 where the peak viscosity temperature of the viscoelastic surfactant gelled treating fluid is from about 160° F. to about 220° F. (about 71° C. to about 104° C.).

4. The method of claim 1 further comprising preheating the viscoelastic surfactant gelled treating fluid at a rate and duration that are sufficient to reach the peak viscosity temperature of the viscoelastic surfactant gelled treating fluid.

5. The method of claim 1 where the viscosity of the preheated viscoelastic surfactant gelled treating fluid while in the low temperature condition is at least about 2 times greater than the viscosity of the viscoelastic surfactant gelled treating fluid before preheating.

6. The method of claim 1 further comprising preheating the viscoelastic surfactant gelled treating fluid before it is introduced into a subterranean formation, the preheating selected from the group consisting of:
  an exothermic chemical reaction;
  an oil-bath oven;
  one or more heated pipes, tubes, or both;
  a heating element that is part of a subsea system; and
  combinations thereof.

7. The method of claim 6 where the viscoelastic surfactant gelled treating fluid is at least partially preheated after being introduced into the low temperature condition.

8. The method of claim 1 further comprising at least partially preheating the viscoelastic surfactant gelled treating fluid before it is introduced into the low temperature condition, the preheating selected from the group consisting of:
  an exothermic chemical reaction;
  an oil-bath oven;
  one or more heated pipes, tubes, or both; and
  combinations thereof.

9. The method of claim 1 further comprising using a subterranean heated pipe, tube, or combinations thereof to heat the viscoelastic surfactant gelled fluid.

10. The method of claim 1 where preheating the viscoelastic surfactant gelled treating fluid is selected from the group consisting of:
  preheating the aqueous solution before adding the viscoelastic surfactant to the aqueous solution;
  preheating the aqueous solution as the viscoelastic surfactant is added to the aqueous solution;
  preheating the aqueous solution after the viscoelastic surfactant is added thereto; and
  combinations thereof.

11. The method of claim 1 further comprising treating a subterranean formation with a treatment selected from the group consisting of:
  fracturing the formation under an effective pressure where the preheated viscoelastic surfactant gelled treating fluid further comprises a proppant;
  packing the formation with gravel where the preheated viscoelastic surfactant gelled treating fluid further comprises gravel;
  stimulating the formation where the preheated viscoelastic surfactant gelled treating fluid further comprises a stimulating agent;
  drilling a well; and
  completing a well.

12. The method of claim 1 where the preheated viscoelastic surfactant gelled treating fluid further comprises a component selected from the group consisting of:
  an internal breaker selected from the group consisting of bacteria, transition metal ion sources, saponified fatty acids, mineral oils, hydrogenated polyalphaolefin oils, saturated fatty acids, unsaturated fatty acids, and combinations thereof;
  a stabilizer selected from the group consisting of alkali metal oxides, alkali metal hydroxides, alkali earth metal oxides, alkali earth metal hydroxides, transition metal oxides, transition metal hydroxides, glycols, polyols, and combinations thereof;
  a fluid loss control agent selected from the group consisting of alkali earth metal oxides, alkali earth metal hydroxides, transition metal oxides, transition metal hydroxides, and mixtures thereof;
  a viscosity enhancer selected from the group consisting of pyroelectric particles, piezoelectric particles, and mixtures thereof; and
  combinations thereof.

13. The method of claim 1 where the low temperature condition is selected from the group consisting of
  an offshore operation where the temperature of the water is 150° F. (about 66° C.) or less;
  a locality having a cold climate; and
  a hydrocarbon land-based operation where the temperature of the rock formation is 120° F. (49° C.) or less.

14. The method of claim 1 where the viscoelastic surfactant is selected from the group consisting of amines, amine salts, quaternary ammonium salts, betaines, amidoamine oxides, amine oxides, and combinations thereof.

15. A method for an offshore hydraulic fracturing operation, gravel packing operation, or both comprising:
  preheating a viscoelastic surfactant gelled treating fluid to a temperature that is at least 60% of its peak viscosity temperature to increase the viscosity of the viscoelastic surfactant gelled treating fluid, the composition of the viscoelastic surfactant gelled treating fluid comprising:
    an aqueous brine; and
    at least one viscoelastic surfactant in an amount effective to increase the viscosity of the brine; and
  allowing the preheated, gelled treating fluid to cool during at least a portion of its delivery from the sea surface to a subterranean formation; and
  introducing the cooled, gelled treating fluid into the subterranean formation, the viscosity of the cooled, gelled treating fluid greater than its viscosity before being preheated and less than its viscosity at its peak viscosity temperature.

16. The method of claim 15 further comprising reducing the viscosity of the treating fluid by reservoir heating the treating fluid to a temperature effective to cause the internal breaker to reduce the fluid viscosity.

17. The method of claim 15 where,
  the aqueous brine is selected from the group consisting of KCl, NaCl, $NH_4Cl$, $CaCl_2$, $CaBr_2$, $ZnCl_2$, $ZnBr_2$, and combinations thereof; and
  the viscoelastic surfactant is selected from the group consisting of amines, amine salts, quaternary ammonium salts, betaines, amidoamine oxides, amine oxides, and combinations thereof.

18. The method of claim 15 where the peak viscosity temperature of the treating fluid is from about 160° F. to about 220° F. (about 71° C. to about 104° C.).

19. The method of claim 18 further comprising preheating the treating fluid to a temperature that is at least 90% of the treating fluid's peak viscosity temperature.

20. The method of claim 15 where preheating is selected from the group consisting of:
  an exothermic chemical reaction;
  an oil-bath oven;
  one or more heated pipes, tubes, or both;
  a heating element that is part of a subsea system; and
  combinations thereof.

* * * * *